United States Patent
Guilbert

(10) Patent No.: US 9,919,427 B1
(45) Date of Patent: Mar. 20, 2018

(54) VISUALIZING ROBOT TRAJECTORY POINTS IN AUGMENTED REALITY

(71) Applicant: X Development LLC, Mountain View, CA (US)

(72) Inventor: Matthieu Guilbert, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 312 days.

(21) Appl. No.: 14/809,180

(22) Filed: Jul. 25, 2015

(51) Int. Cl.
*B25J 9/18* (2006.01)
*B25J 9/16* (2006.01)

(52) U.S. Cl.
CPC .......... *B25J 9/1697* (2013.01); *B25J 9/1664* (2013.01); *G05B 2219/40512* (2013.01)

(58) Field of Classification Search
CPC .... B25J 9/16–9/20; G05B 2219/39014; G05B 2219/39022; G05B 2219/39057; G05B 2219/36167; G05B 2219/39449; G05B 2219/39451; G05B 2219/39397; G05B 2219/35422; G05B 2219/35506
See application file for complete search history.

(56) References Cited

U.S. PATENT DOCUMENTS

| | | | |
|---|---|---|---|
| 4,853,771 A * | 8/1989 | Witriol | B25J 9/1697 235/375 |
| 5,543,802 A | 8/1996 | Villevieille et al. | |
| 7,231,063 B2 | 6/2007 | Naimark et al. | |
| 7,353,082 B2 | 4/2008 | Pretlove et al. | |
| 7,539,557 B2 | 5/2009 | Yamauchi | |
| 7,714,895 B2 | 5/2010 | Pretlove et al. | |
| 7,908,040 B2 | 3/2011 | Howard et al. | |
| 7,974,738 B2 | 7/2011 | Bruemmer et al. | |

(Continued)

FOREIGN PATENT DOCUMENTS

| | | |
|---|---|---|
| EP | 1435280 | 8/2008 |
| WO | 2003/045640 | 6/2003 |
| WO | 2006/043873 | 4/2006 |

OTHER PUBLICATIONS

Kobayashi et al., "Viewing and reviewing how humanoids sensed, planned and behaved with mixed reality technology", Humanoid Robotics, 2007 7th IEEE-RAS International Conference, IEEE, Nov. 29, 2007, pp. 130-135.

(Continued)

*Primary Examiner* — Adam R Mott
(74) *Attorney, Agent, or Firm* — McDonnell Boehnen Hulbert & Berghoff LLP

(57) ABSTRACT

An example method includes receiving, from a sensor, an image of an environment, where the environment includes a robotic device. The method also includes determining, based on the received image of the environment, a pose of the robotic device relative to the sensor. The method further includes determining, based on the pose of the robotic device relative to the sensor, respective positions of a plurality of trajectory points for the robotic device relative to the sensor. The method additionally includes providing for display of the image of the environment and an overlaid plurality of virtual trajectory points corresponding to the plurality of trajectory points, where the plurality of virtual trajectory points are positioned in the image based on the determined respective positions of the plurality of trajectory points for the robotic device relative to the sensor.

20 Claims, 15 Drawing Sheets

(56) References Cited

U.S. PATENT DOCUMENTS

| | | | |
|---|---|---|---|
| 8,225,226 B2 | 7/2012 | Skourup et al. | |
| 8,340,820 B2 | 12/2012 | Nair | |
| 8,386,078 B1 | 2/2013 | Hickman et al. | |
| 8,406,926 B1 | 3/2013 | Lewis | |
| 8,594,845 B1 | 11/2013 | Gharpure | |
| 8,731,276 B2 | 5/2014 | Mizutani et al. | |
| 8,874,261 B2 | 10/2014 | Hein et al. | |
| 2002/0161477 A1 | 10/2002 | Doi | |
| 2004/0189631 A1* | 9/2004 | Kazi | B25J 9/1671 345/418 |
| 2005/0227724 A1 | 10/2005 | Tsai | |
| 2007/0208442 A1 | 9/2007 | Perrone | |
| 2011/0311127 A1* | 12/2011 | Mizutani | B25J 9/1676 382/153 |
| 2013/0073089 A1 | 3/2013 | Nakahara | |
| 2013/0117377 A1 | 5/2013 | Miller | |
| 2013/0218340 A1 | 8/2013 | Hager et al. | |
| 2013/0226344 A1 | 8/2013 | Wong et al. | |
| 2013/0278631 A1 | 10/2013 | Border et al. | |
| 2013/0300637 A1 | 11/2013 | Smits et al. | |
| 2013/0346348 A1 | 12/2013 | Buehler et al. | |
| 2014/0058407 A1 | 2/2014 | Tsekos et al. | |
| 2014/0129942 A1 | 5/2014 | Rathod | |
| 2014/0316570 A1 | 10/2014 | Sun et al. | |
| 2014/0336818 A1 | 11/2014 | Posselius et al. | |

OTHER PUBLICATIONS

Chestnutt et al., "Interactive control of humanoid navigation", The 2009 IEEE/RSJ International Conference on Intelligent Robots and Systems, Oct. 10, 2009, pp. 3519-3524.

Stilman et al., "Augmented reality for robot development and experimentation", Technical Report CMU-RI-TR-05-55, Nov. 30, 2005, pp. 1-11.

Hanoon Park and Jong-Il Park, Invisible Marker Based Augmented Reality System, Division of Electrical and Computer Engineering, Hanyang University, Seoul, South Korea, Proc. of SPIE vol. 5960, 8 pages.

Faessler et al., "A Monocular Pose Estimate System based on Infrared LEDs," 2014 IEEE International Conference on Robotics and Automation (ICRA), IEEE, 2014, pp. 907-913.

Siyu E, "Evaluation of Visible and Invisible Fiducial Markers for Clothing Tracking," Technical Report No. UCB/EECS-2012-153, Electrical Engineering and Computer Sciences, University of California at Berkeley, Jun. 1, 2012, 21 pages.

Wang et al., "Infrared Marker based Augmented Reality System for Equipment Maintenance," 2008 International Conference on Computer Science and Software Engineering, IEEE, pp. 816-819.

M.F. Zaeh et al., Interactive Laser-Projection for Programming Industrial Robots, Technical University Munich, Institute for Machine Tools, Garching, Germany, 2006, pp. 125-128.

* cited by examiner

VISUALIZING ROBOT TRAJECTORY POINTS IN AUGMENTED REALITY

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems that can operate alongside and interface with humans becomes apparent. Therefore, a demand for such robotic systems has helped open up a field of innovation in actuators, sensing techniques, controllers, as well as component design and assembly.

SUMMARY

Example systems and methods may allow for display of robot trajectory points within an augmented reality presentation. An image of a robot's environment may be captured using a sensor, such as a camera on a head-mounted display. The robot's pose (e.g., position and orientation) in the environment relative to the camera may be determined from the image. Based on this pose, positions of one or more trajectory points for the robot relative to the camera may also be determined. The trajectory points may then be projected into an image of the environment and graphically overlaid as virtual trajectory points to illustrate where the trajectory points will cause the robot to move within an actual image of the robot's current environment.

In one aspect, a method is provided. The method includes receiving, from a sensor, an image of an environment, where the environment includes a robotic device. The method also includes determining, based on the received image of the environment, a pose of the robotic device relative to the sensor. The method further includes determining, based on the pose of the robotic device relative to the sensor, respective positions of a plurality of trajectory points for the robotic device relative to the sensor. The method additionally includes providing for display of the image of the environment and an overlaid plurality of virtual trajectory points corresponding to the plurality of trajectory points, where the plurality of virtual trajectory points are positioned in the image based on the determined respective positions of the plurality of trajectory points for the robotic device relative to the sensor.

In another aspect, a system is provided that includes a sensor and a computing system. The computing system may be configured to receive, from the sensor, an image of an environment, where the environment includes a robotic device. The computing system may also be configured to determine, based on the received image of the environment, a pose of the robotic device relative to the sensor. The computing system may be further configured to determine, based on the pose of the robotic device relative to the sensor, respective positions of a plurality of trajectory points for the robotic device relative to the sensor. The computing system may also be configured to provide for display of the image of the environment and an overlaid plurality of virtual trajectory points corresponding to the plurality of trajectory points, where the plurality of virtual trajectory points are positioned in the image based on the determined respective positions of the plurality of trajectory points for the robotic device relative to the sensor.

In yet another aspect, a non-transitory computer-readable medium is provided having stored therein instructions, that when executed by a computing system, cause the computing system to perform functions. The functions include receiving, from a sensor, an image of an environment, where the environment includes a robotic device. The functions also include determining, based on the received image of the environment, a pose of the robotic device relative to the sensor. The functions further include determining, based on the pose of the robotic device relative to the sensor, respective positions of a plurality of trajectory points for the robotic device relative to the sensor. The functions additionally include providing for display of the image of the environment and an overlaid plurality of virtual trajectory points corresponding to the plurality of trajectory points, where the plurality of virtual trajectory points are positioned in the image based on the determined respective positions of the plurality of trajectory points for the robotic device relative to the sensor.

In yet another aspect, another system is provided. The system includes means for receiving, from a sensor, an image of an environment, where the environment includes a robotic device. The system also includes means for determining, based on the received image of the environment, a pose of the robotic device relative to the sensor. The system further includes means for determining, based on the pose of the robotic device relative to the sensor, respective positions of a plurality of trajectory points for the robotic device relative to the sensor. The system additionally includes means for providing for display of the image of the environment and an overlaid plurality of virtual trajectory points corresponding to the plurality of trajectory points, where the plurality of virtual trajectory points are positioned in the image based on the determined respective positions of the plurality of trajectory points for the robotic device relative to the sensor.

These as well as other aspects, advantages, and alternatives will become apparent to those of ordinary skill in the art by reading the following detailed description, with reference where appropriate to the accompanying drawings.

DETAILED DESCRIPTION

Figure 1:
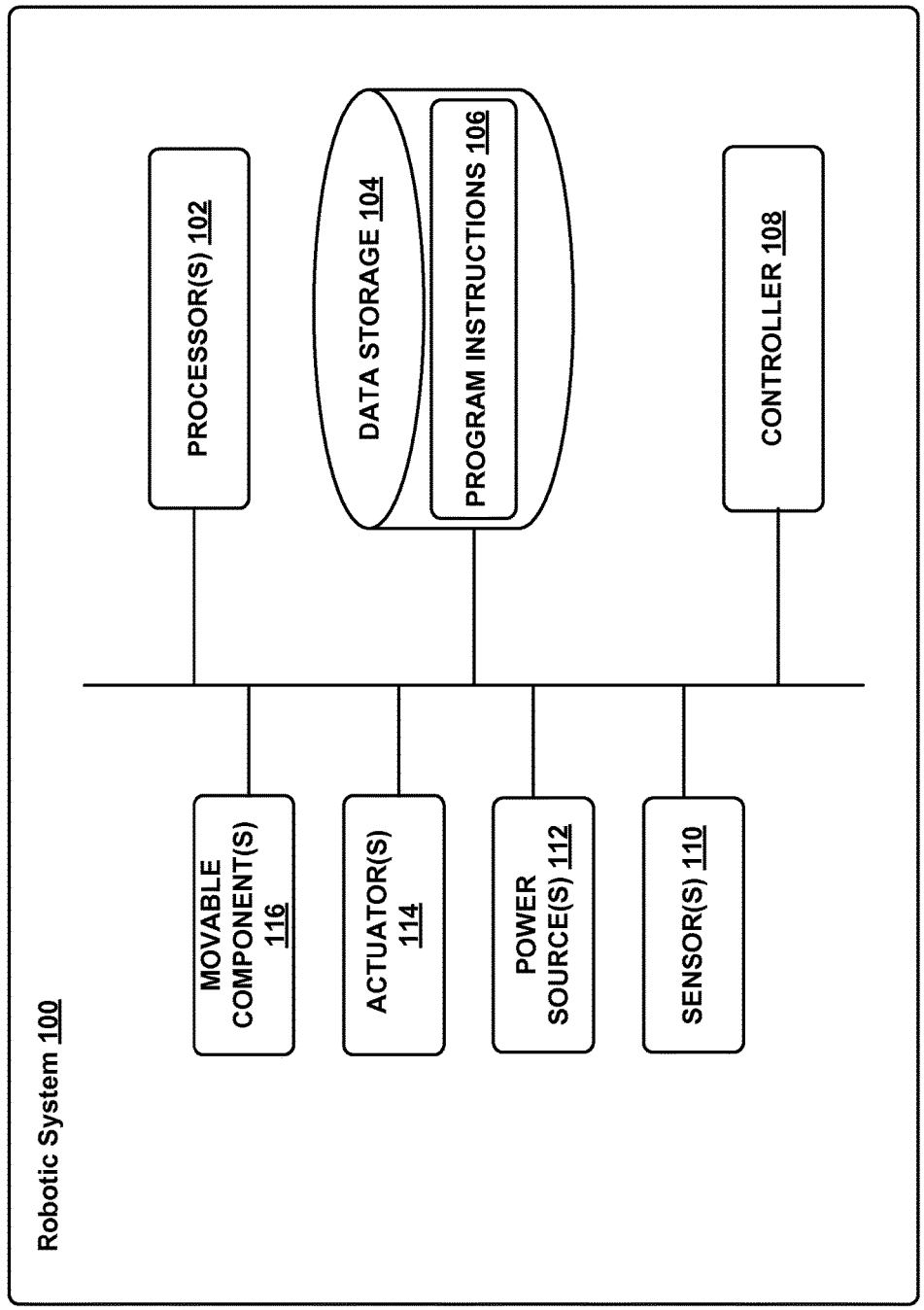
FIG. 1 illustrates an example configuration of a robotic system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures. Augmented reality may be used with robotics to provide a visual image of a robot with certain useful information virtually overlaid on a display. For instance, a tablet computer or a head-mounted device ("HMD") with a sensor (e.g., a camera) directed at a robot may be used to show an augmented reality presentation that includes a live video feed of the robot. An advantage of using augmented reality instead of an entirely virtual 3D model (e.g., a computer-aided design or "CAD" model) is that a virtual 3D model may not always have an accurate representation of the current configuration of a robot's operating environment (also referred to as a "workcell").

Using a 3D model may be particularly problematic when instructing robot motion using predefined trajectory points for the robot (also referred to as "teach points" or "waypoints"). For instance, the trajectory points may have been previously programmed by a user as three-dimensional points relative to the base of the robot without knowledge of the robot's current environment. If a 3D model of the environment is not accurate, a trajectory may therefore be commanded which unexpectedly causes the robot to collide with an object in the environment or produces other unexpected results.

Example systems and methods are provided that use augmented reality to visually present trajectory points for a robot within an actual image of the robot's environment. The system may therefore allow a user to preview a particular motion path for a robot within an image of the robot's current workcell before commanding the robot to move through the motion path.

In order to determine where to project a robot's trajectory points into an image, the pose (e.g., position and orientation) of the robot relative to the camera may be determined. This pose may be estimated directly by processing an image of the robot. In additional examples, one or more fiducial markers (also referred to as "ARTags") may be placed on the robot (e.g., on a base of the robot). These fiducial markers within an image of the robot may then be identified and used to determine where the robot is within an environment relative to the camera. Once the pose of the robot is determined relative to the camera, positions of one or more waypoints for the robot relative to the camera may also be determined. Based on these positions, the one or more waypoints may be projected into an augmented reality presentation to inform a user where the waypoints will send the robot within its given environment.

In further examples, one or more ARTags may be placed on one or more other fixed objects within the environment as well or instead, such as on a table, a wall, a door frame, or another machine. These tags may be referenced with the robot by determining where the tags are within the environment relative to the robot. Then, when the augmented reality display device is oriented so that its view does not include the robot, the trajectory points may still be positioned properly on the display by identifying one or more of the tags within the image. In additional examples, the ARTags within the environment may be referenced directly with the trajectory points for the robot as well or instead.

Trajectory points and/or other information may be displayed to a user within an augmented reality presentation in various ways. In some examples, full trajectories may overlaid onto the image of the robot's environment (e.g., as paths made up of sequences of connected trajectory points). In additional examples, the display may include a virtual simulation of the robot's movement through a given trajectory or sequence of trajectory points. For instance, a virtual simulation may graphically illustrate how the robot motion will actually look within a particular workcell before the robot is commanded to physically move within the workcell. In another example, one or more collision points may also be displayed which warn the user of possible collisions that may occur if the robot is commanded to move through a given trajectory in a particular workcell.

Referring now to the figures, FIG. 1 shows an example configuration of a robotic system 100. The robotic system 100 may be a robotic arm, a different type of robotic manipulator, or it may have a number of different forms. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment.

Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2:
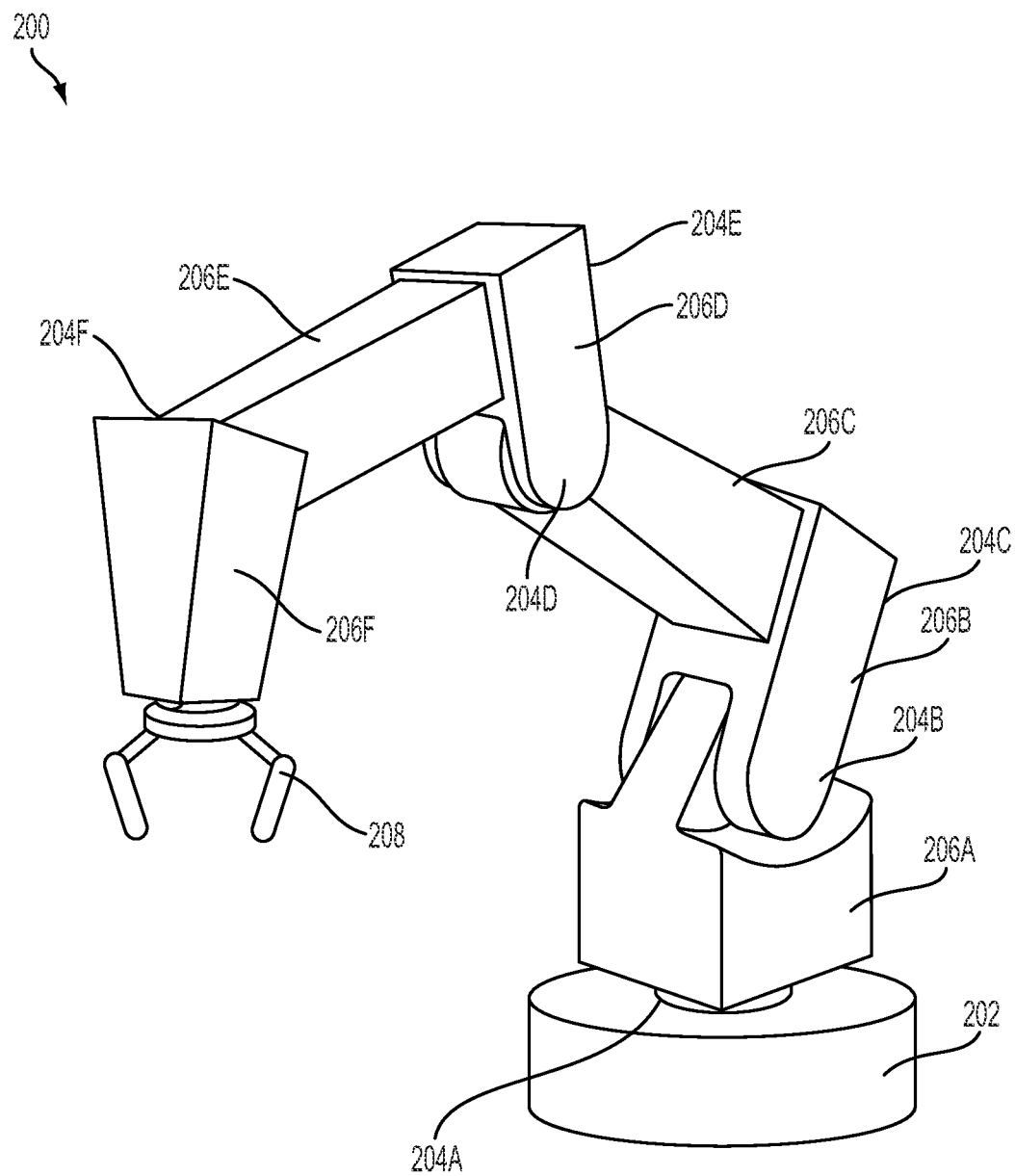
FIG. 2 illustrates an example robotic arm, according to an example embodiment.

A robotic system 100 may take on various forms. To illustrate, FIG. 2 shows an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204F each coupled to one or more of the actuator(s) 114. The actuators in joints 204A-204F may operate to cause movement of various movable component(s) 116 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the movable component(s) 116, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3:
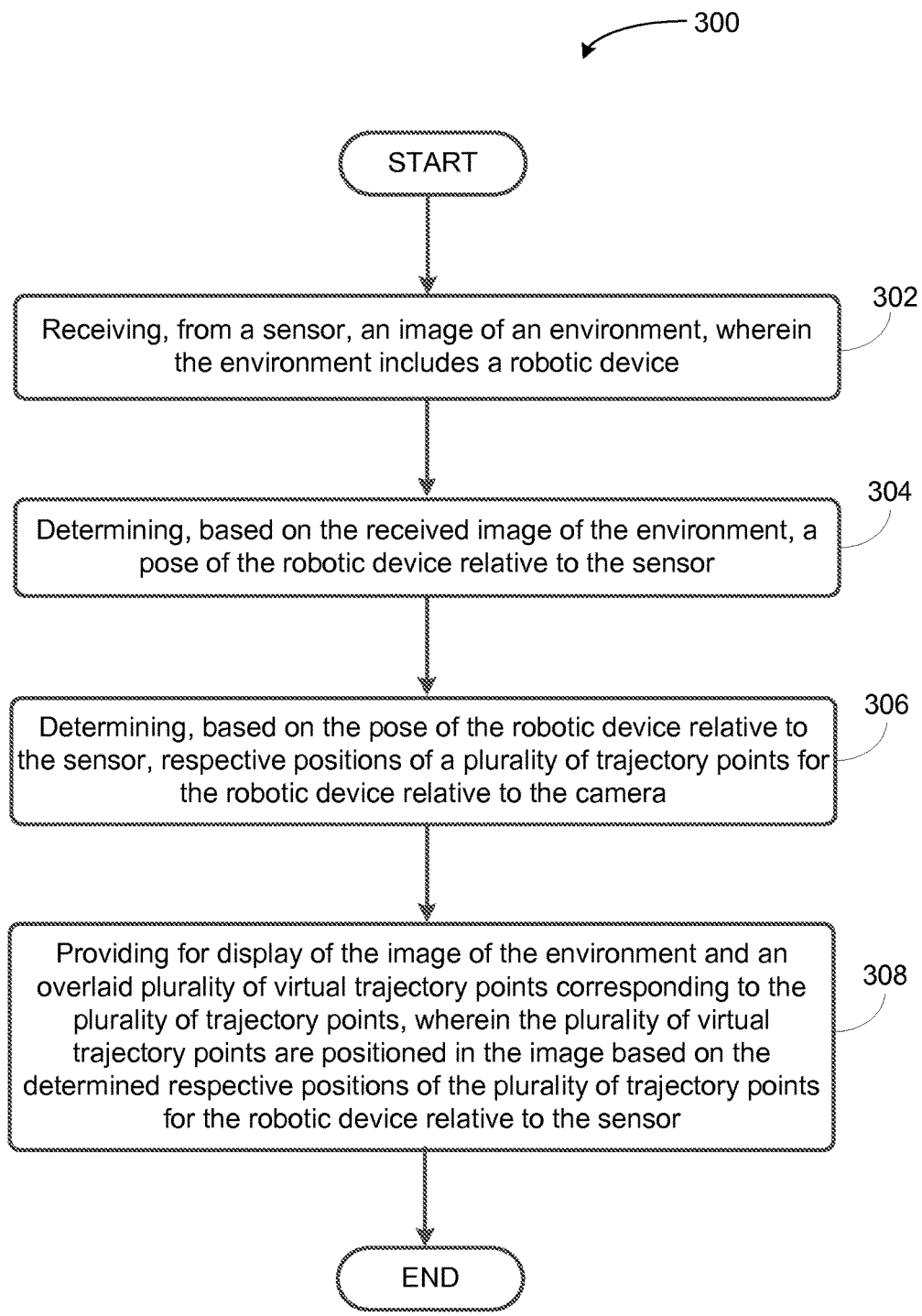
FIG. 3 is a block diagram of an example method, according to an example embodiment.

FIG. 3 illustrates a flowchart showing a method 300 that may allow for display of virtual trajectory points for a robot within augmented reality, according to an example embodiment. Method 300 may be carried out using a display device that includes a camera, such as a tablet device, a smartphone, an HMD, or a laptop computer. In some examples, method 300 may be executed by a local or remote control system of such a device. In further examples, a sensor that is separate from the display device may be used. In additional examples, implementation of method 300 may involve a robotic device, such as a robotic device as illustrated and described with respect to FIGS. 1 and 2. Some or all of the steps of method 300 may also be executed by a control system of the robotic device. Other arrangements are also possible.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 involves receiving an image of an environment from a sensor. The sensor may be a visual camera, a depth camera, or a different type of 2D and/or 3D sensor. The image may be a single still image, a series of still images, and/or a video stream. In further examples, the sensor may be a depth camera that provides a stereoscopic pair of images (e.g., one two-dimensional image and one depth image). Additionally, the environment may include at least one robotic device, such as the system described and illustrated with respect to FIGS. 1 and 2. Within examples, the image may include the entire robotic device, a portion of the robotic device, or none of the robotic device. Additionally, the image may be a video stream that includes the robotic device at some times, but not at other times. For instance, a camera may be part of an HMD, and the user may control the orientation of the HMD to point at the robot at some times, and to point at other objects within the robot's workcell at other times.

Figure 4A:
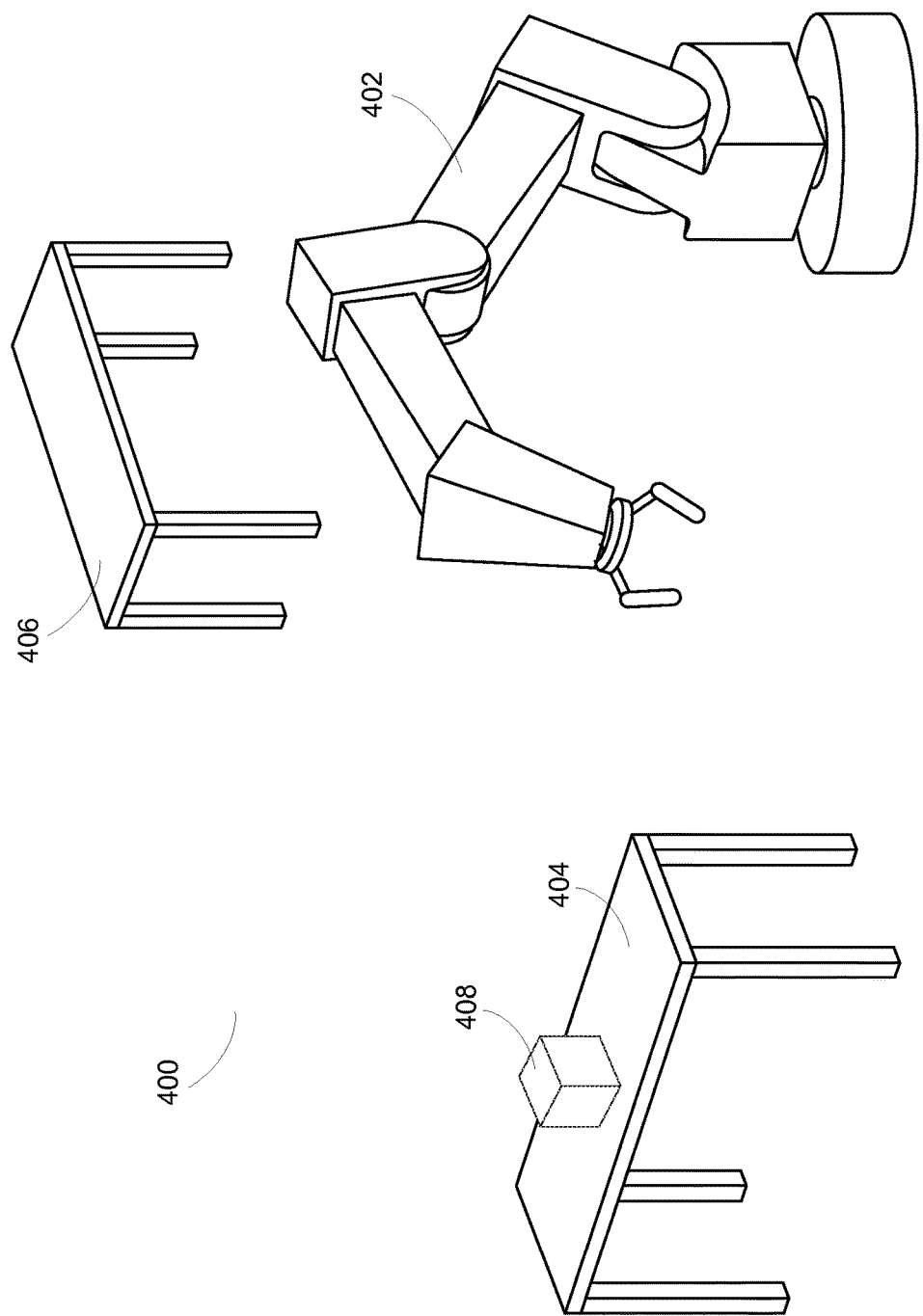
FIGS. 4A, 4B, 4C, and 4D illustrate an example scenario in which trajectory points are displayed in an augmented reality presentation, according to an example embodiment.

FIG. 4A illustrates a portion of an environment that includes a robotic device and several other objects, accordingly to an example embodiment. More specifically, a robot 402 may be controlled to operate within workcell 400, which includes several objects, including a table 404, a second table 406, and a box 408. In this example, robot 402 may be controlled to use its gripper to move objects such as boxes from one or location to another within workcell 400. In other examples, robot 402 may be controlled to perform a variety of different possible operations, such as for material handling, pick and place, construction, and/or some other type of application.

In some examples, the robot 402 may be periodically moved from one workcell to another (e.g., to different locations within a warehouse). In further examples, that state of workcell 400 may periodically change while the robot 402 is operating. For instance, one of the tables 404, 406 may be moved around within the workcell 400. Additionally, objects such as box 408 may enter or exit the workcell (e.g., on a conveyor belt), or may otherwise be repositioned within the workcell. For a user to control or instruct movements of robot 402 within workcell 400, it may be important to know the current configuration of the workcell 400.

Figure 4B:
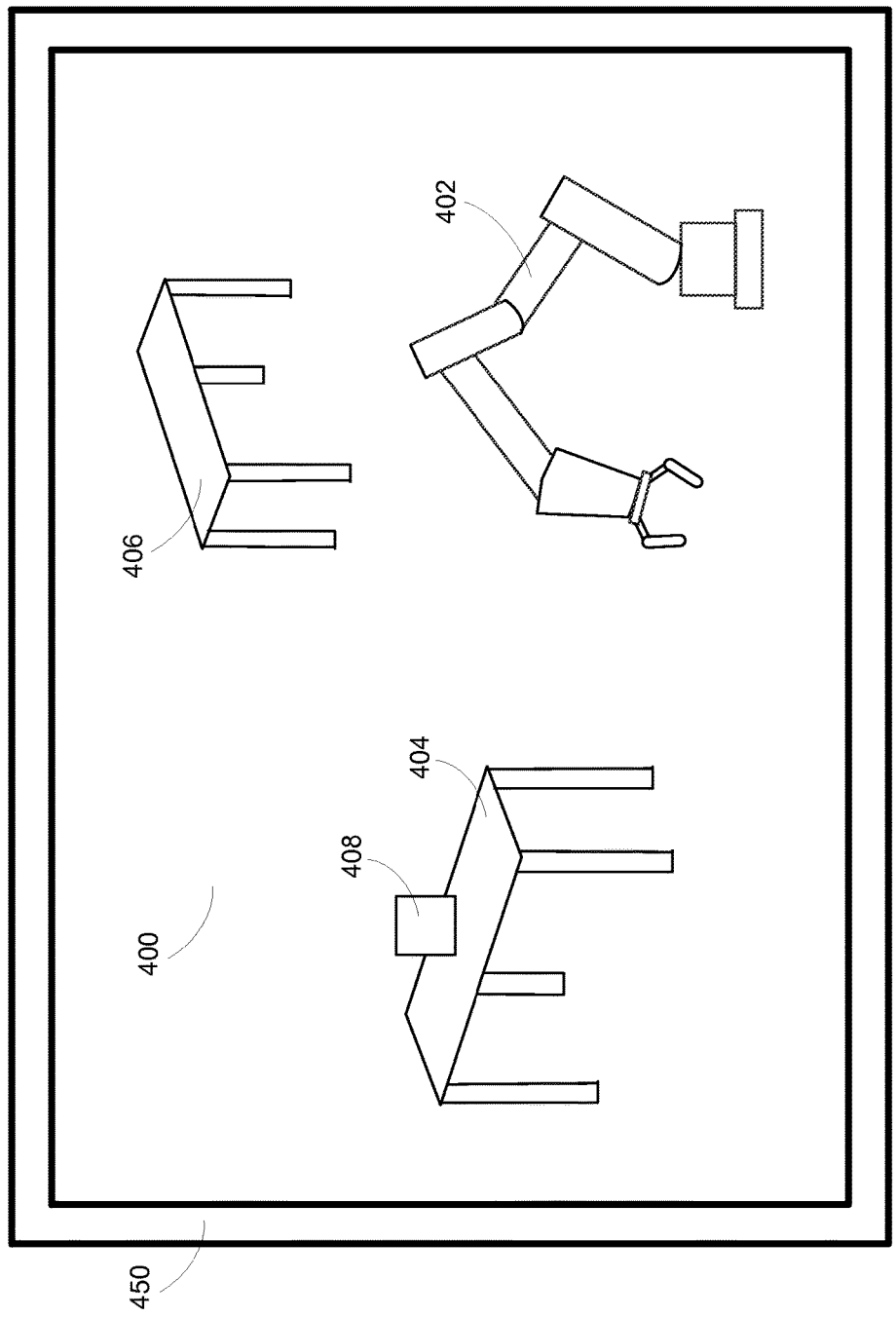

FIG. 4B illustrates an image of the workcell from FIG. 4A, according to an example embodiment. More specifically, an image of the workcell 400 is displayed on a display interface 450. In some examples, the display interface 450 may be an interface of a device that also includes the camera which captured the image. For instance, the device may be a tablet computer or an HMD which may be directed at the workcell 400 to show the workcell 400 on display interface 450. In other examples, the display interface 450 may be separate from the camera. For instance, the display interface 450 could be an interface of a laptop or desktop computer. Other types of devices may be used to capture and/or display the image of workcell 400 as well or instead.

As illustrated in FIG. 4B, the image of the workcell 400 may be displayed as a two-dimensional (2D) image. In some examples, the image may be a single still image, or a series of still images that are periodically updated as they are received from the camera. In other examples, the image may be a video stream that is continuously received from the camera for display. As the orientation of the camera changes, the image may be updated to show different portions of the workcell 400 from different points of view. In further examples, the image may also be displayed as a three-dimensional (3D) image.

Referring back to FIG. 3, method 300 further involves determining a pose of the robotic device relative to the sensor, as shown by block 304. More specifically, the image of the environment may be processed to determine where the robot is located within the environment relative to the camera. Within examples, determining the pose of the robot includes determining a position (X, Y, Z) and an orientation (yaw, pitch, roll) of the robot relative to the camera (e.g., six degrees of freedom).

Within examples, the pose of the robot relative to the camera may be determined by processing an image that includes part or all of the robot. In particular, the size and/or shape of the robot within a 2D image may be used to estimate the translation and rotation of the robot from the camera (e.g., because an object that is further away will appear smaller when projected into the 2D image). The system may have prior knowledge of the size of the robot in the environment. Based on this size, the expected size of the robot when projected into a 2D image at different distances may be determined, and used to estimate how far away the robot is in a given image. In some examples, joint positioning of the robot (e.g., encoded joint angles) may be received and used to help refine the estimate of the pose of the robot (e.g., to account for situations where the image is partially obstructed, including by part of the robot itself).

In additional examples, the pose of the robot relative to the camera may be determined by identifying one or more fiducial markers (e.g., ARTags) on the robot, as described in more detail below. In further examples, when the robot is not included within the image, the pose of the robot relative to the camera may still be determined by identifying one or more fiducial markers in the environment that have been referenced with the robot, which is also described in more detail below.

Method 300 further involves determining positions of trajectory points for the robot relative to the sensor, as shown by block 306. More specifically, once the pose of the robot relative to the camera is determined, the robot may be used as a reference point to determine where to virtually overlay trajectory points as part of an augmented reality presentation. In particular, the pose of the robot relative to the camera may be used to determine where trajectory points which were defined relative to the robot will be located relative to the camera. These locations may be used to virtually project the trajectory points into a 2D image captured by the camera.

Within examples, a trajectory point is a point relative to the robot that is within a range of motion of the robot. More specifically, a trajectory point may have an (X,Y,Z) coordinate in a frame defined relative to the robot, with the origin located at the base of the robot. The robot may be commanded to move through a sequence of trajectory points within a workcell (e.g., to perform an operation such as moving an object). For instance, the robot may be instructed to move its end effector through the trajectory points. In some examples, trajectory points may be received from a list of previously determined trajectory points or trajectories, which may have been instructed by a user or by a different third party. The trajectory points may have been determined before the robot was moved to its current workcell. Additionally, the trajectory points may come from several different past trajectories.

Figure 4C:
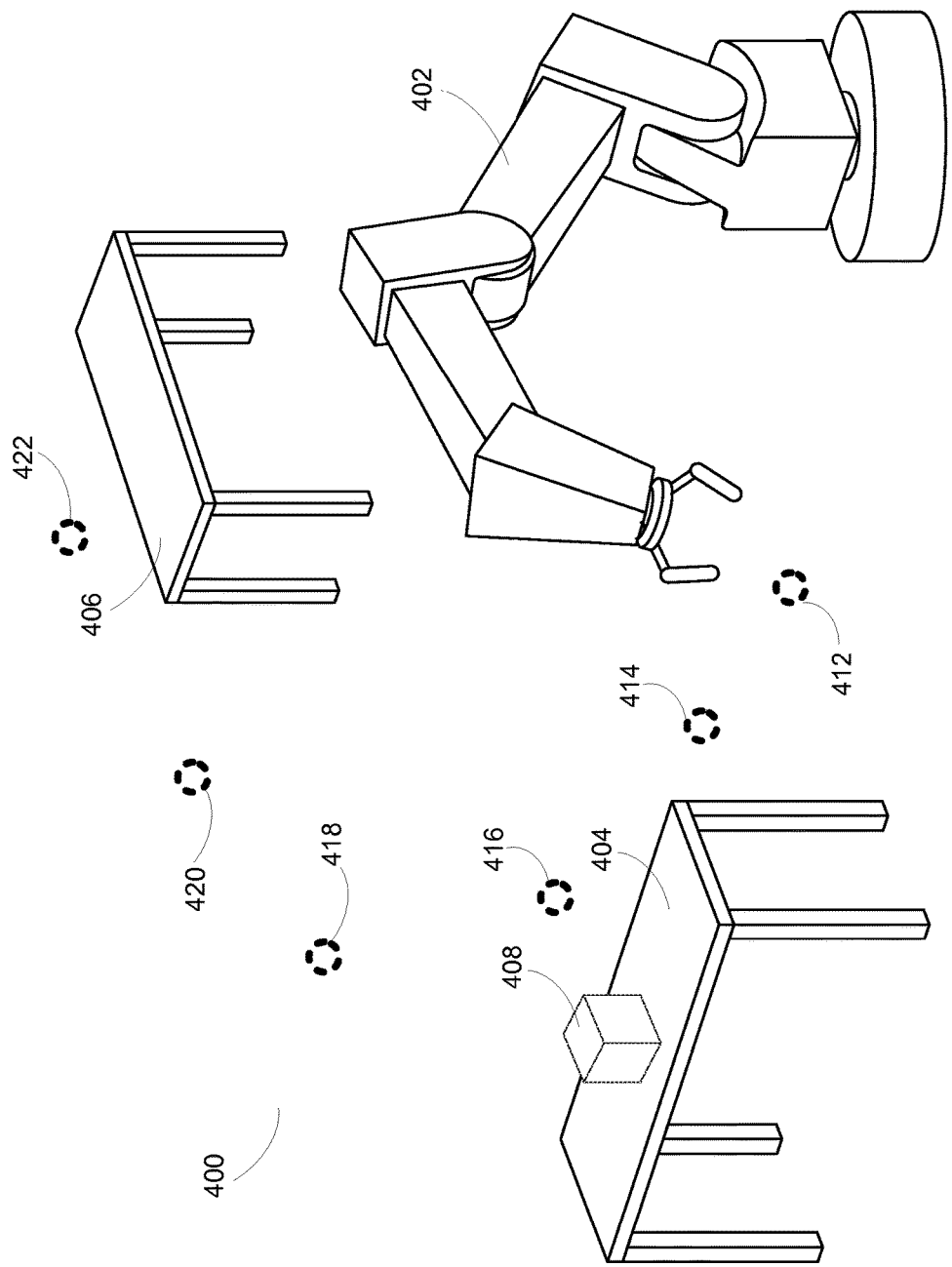

FIG. 4C illustrates trajectory points for a robot, according an example embodiment. More specifically, trajectory points 412, 414, 416, 418, 420, and 422 for robot 402 are illustrated as points within workcell 400. For instance, the trajectory points may be coordinates relative to a base of the robot 402 that the end effector (e.g., the gripper) of the robot 402 will move to when instructed by a user. The trajectory points 412-422 are illustrated with dashed lines in this example to indicate that the points are not visible within the workcell 400. In some examples, the trajectory points may be determined by a user based on a current configuration of workcell 400. For instance, robot 402 may be instructed to move through trajectory points 412-422 to pick up box 408 from table 404 and move it to table 406. In further examples, a user may reuse the trajectory points 412-422 for robot 402 at a point in time after the configuration or arrangement of objects within workcell 400 has changed in one or more ways.

Within examples, the positions of trajectory points 412-422 relative to robot 402 (e.g., a base of the robot) are previously determined or recorded. Accordingly, once the pose of robot 402 relative to a camera capturing an image of the workcell 400 is determined, the positions of trajectory points 412-422 relative to the camera may also be determined.

Referring back to FIG. 3, method 300 further involves providing for display of the image of the environment with overlaid virtual trajectory points, as shown by block 308. More specifically, once positions of the trajectory points relative to the camera are determined, the trajectory points may be projected into an image captured by the camera and represented graphically as virtual trajectory points. An augmented reality presentation may be displayed showing an actual image of the robot's environment (e.g., a live video stream) along with virtual annotations showing where particular trajectory points will cause the robot to move within an image of the environment. For example, the presentation may be used by a user to preview where trajectory points will cause the robot to move before the user selects trajectory points and issues instructions to the robot to move to the selected trajectory points.

As described in more detail below, virtual trajectory points may be graphically displayed in a variety of ways, including as individual points, sequences of connected points, or even as a virtual simulation of the robot moving through the points. Additionally, the augmented reality presentation may be displayed on a device such as an HMD or tablet device that includes a camera which captures an image of the environment, or the presentation may be displayed on a separate computing device such as a laptop computer.

Figure 4D:
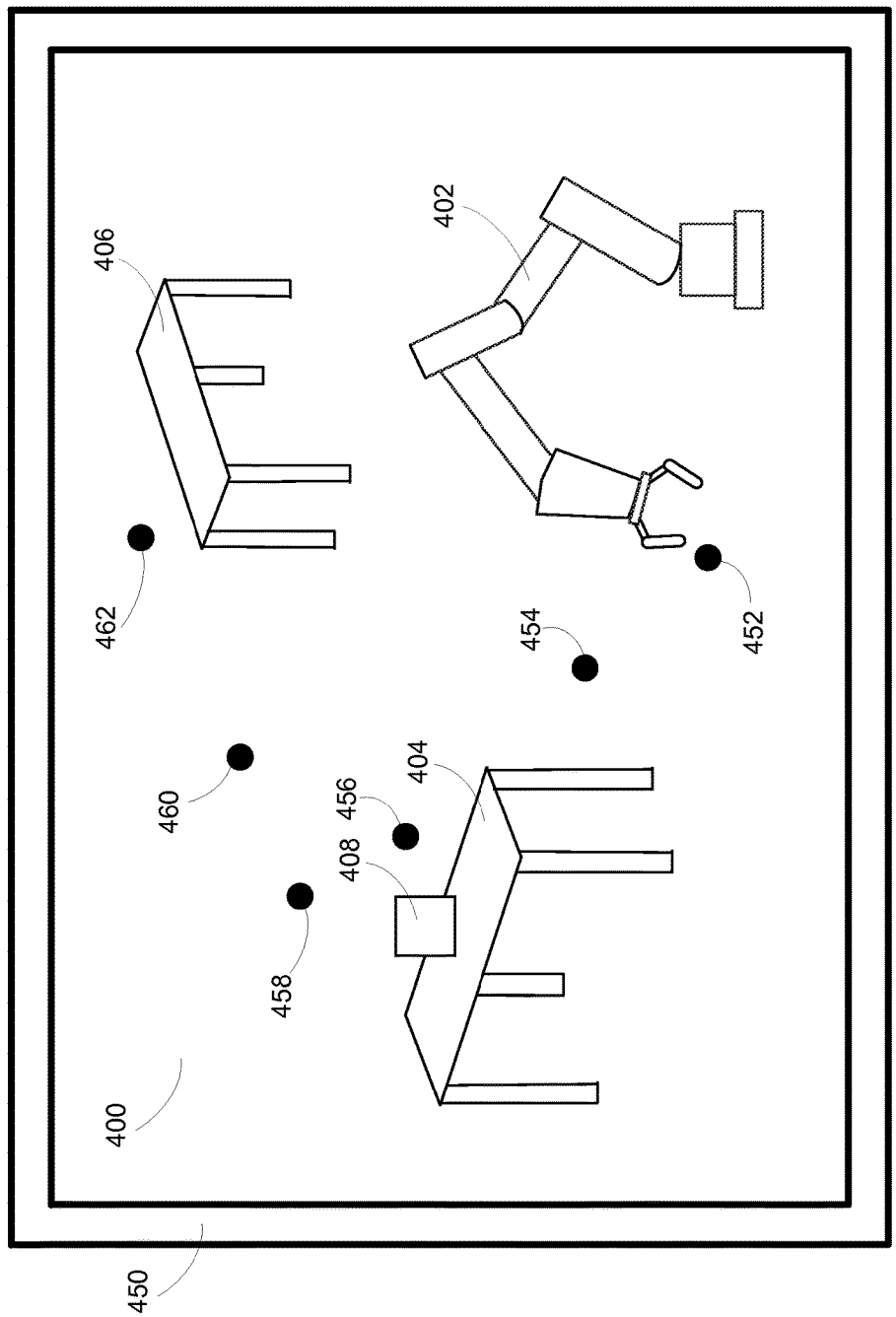

FIG. 4D illustrates an image of a robot's environment with overlaid virtual trajectory points, according to an example embodiment. More specifically, the display interface 450 may show an image of the workcell 400 of robot 402 along with virtual trajectory points 452, 454, 456, 458, 460, and 462 graphically overlaid onto the image. The positions of virtual trajectory points 452-462 within the image may be determined based on the determined positions of corresponding trajectory points 412-422. For instance, virtual trajectory point 452 may be positioned within the image by projecting trajectory point 412 into the image, virtual trajectory point 454 may be positioned within the image by projecting trajectory 414 into the image, and so on. In some examples, only a subset of the trajectory points 412-422 may be projected into the image depending on the orientation of the camera. The particular virtual trajectory points shown overlaid on the image may then change as the camera orientation changes (e.g., as a user wearing an HMD looks around the environment).

In some examples, there may be some error involved in placing virtual trajectory points 452-462 within the image of the robot's environment. For instance, there may be some error in processing the image of the robot to determine where the robot is relative to the camera. In some applications, an augmented reality presentation with some imprecision in placing the virtual trajectory points 452-462 may still be helpful to give a user a general idea of where the trajectory points will cause the robot to move within the workcell 400.

Figure 5A:
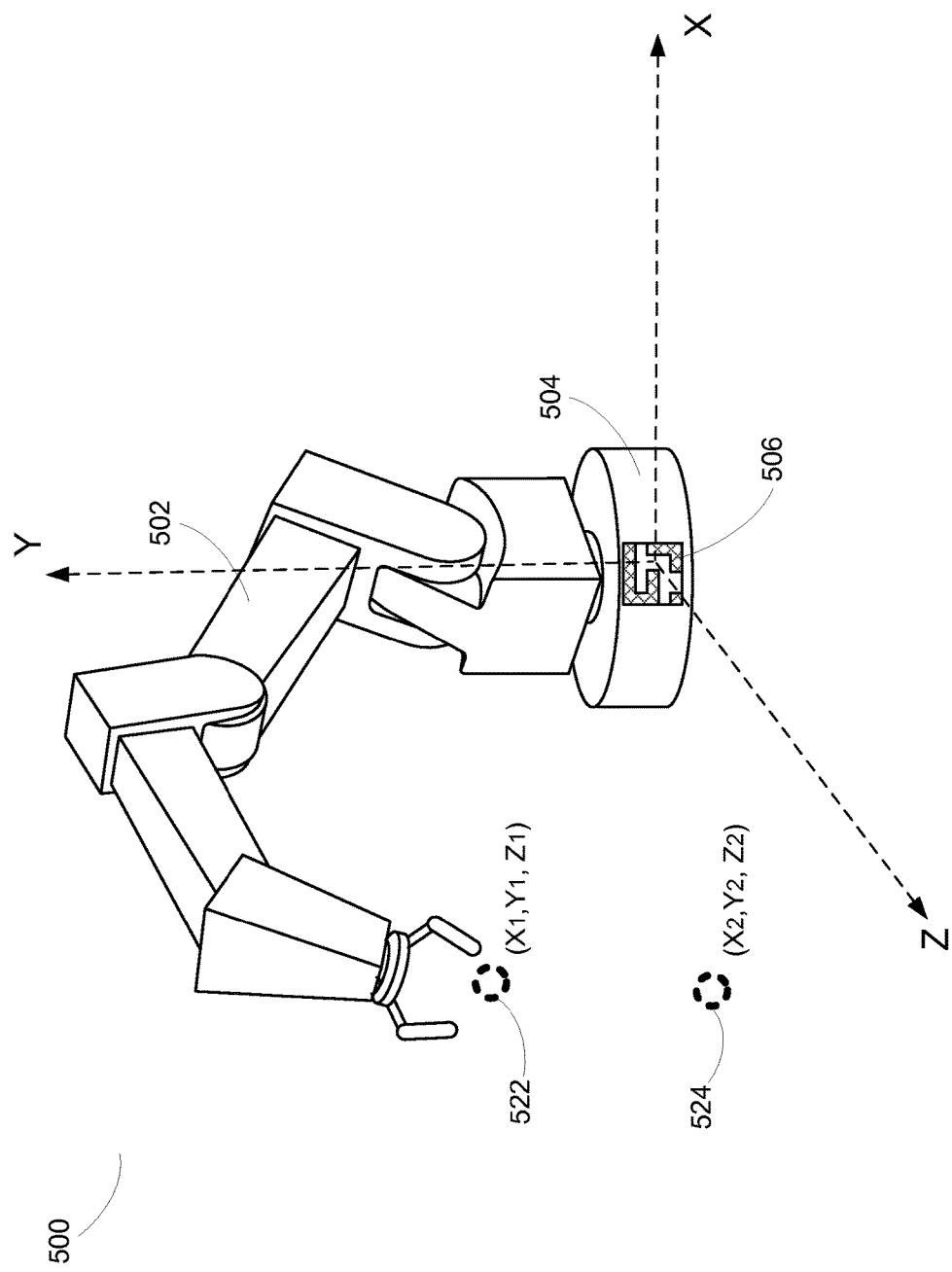
FIGS. 5A, 5B, 5C, and 5D illustrate another example scenario in which trajectory points are displayed in an augmented reality presentation, according to an example embodiment.

FIG. 5A illustrates trajectory points for a robot with an ARTag, according to an example embodiment. More specifically, a robot 502 operating within environment 500 may be provided with a fiducial marker such as ARTag 506 on a base 504 of the robot 502. The ARTag 506 may have a particular identifying pattern (e.g., a barcode) detectable by a camera and may be used to determine the pose of robot 502 with greater precision than using image processing directly on an image of the robot.

The ARTag 506 may be located by identifying a three-dimensional point in space (e.g., the center of ARTag 506) and a normal to the ARTag 506. Based on this information, the pose of ARTag 506 may be determined. In particular, a frame may be attached to ARTag 506 as illustrated in FIG. 5A. This frame may be used to determine the position of trajectory points 522, 524 for the robot 502. For instance, ARtag 506 may be placed on the base 504 of the robot 502, and the trajectory points 522, 524 may be defined relative to the base 504 of the robot 502. In particular, trajectory point 522 may have coordinates $(X_1, Y_1, Z_1)$ and trajectory point 524 may have coordinates $(X_2, Y_2, Z_2)$ in the frame attached to ARtag 506. Accordingly, once ARtag 506 (and the attached frame) is located, the positions of trajectory point 522 and trajectory point 524 may also be located. In further examples, one or more fiducial markers may be placed elsewhere on the robot besides the base as well or instead.

Figure 5B:
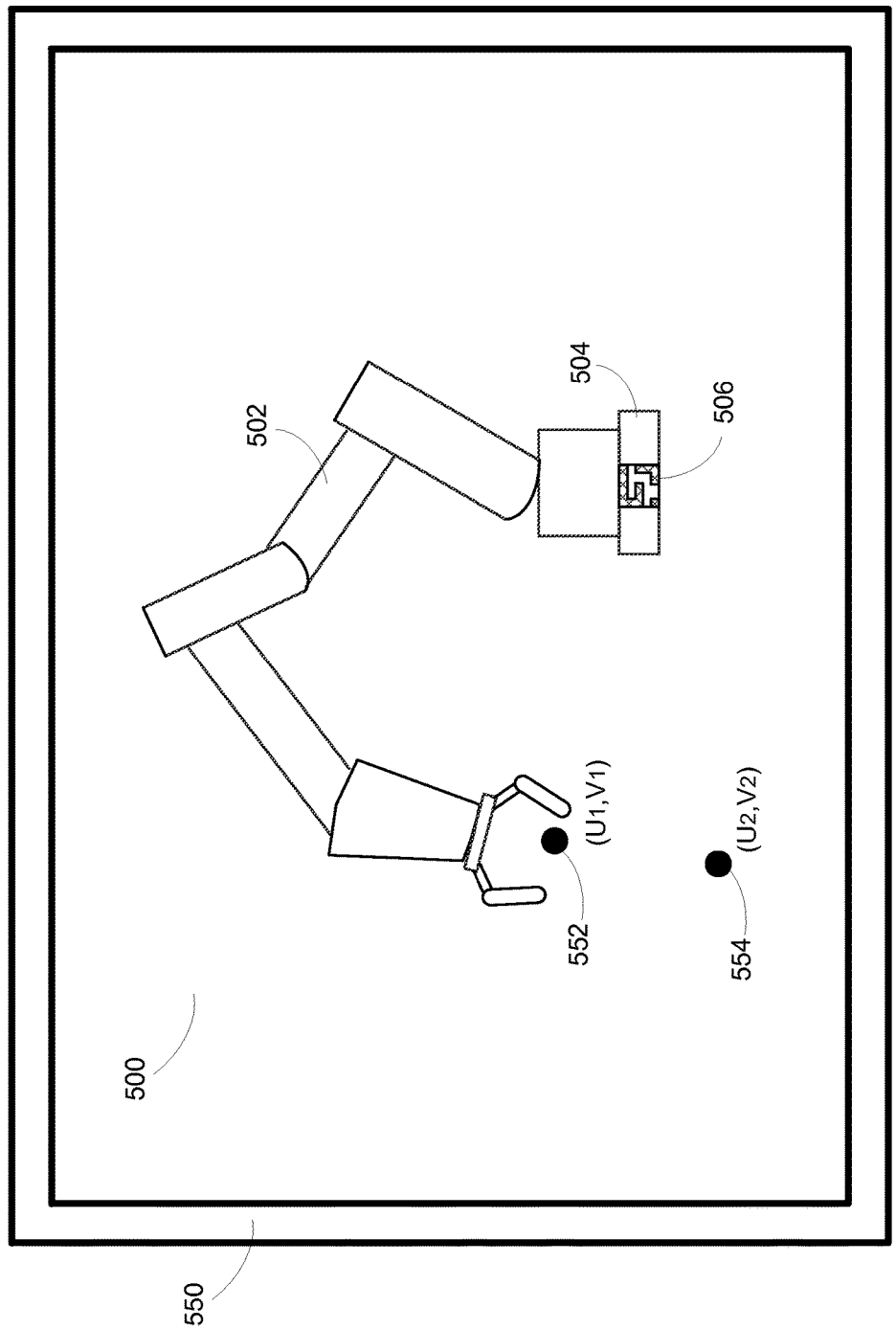

FIG. 5B illustrates an image of the robot from FIG. 5A with overlaid virtual trajectory points, according to an example embodiment. More specifically, display interface 550 shows a portion of the operating environment 500 that includes robot 502. Display interface 550 may be an interface of a device that includes a camera which captures the image of the robot 502. ARTag 506 may be identified and located within the image. Based on the size and shape of ARTag 506 within the image, the pose of ARTag 506 relative to the camera may be determined. In particular, a transformation between a frame attached to ARTag 506 and a frame attached to the camera may be determined. Virtual trajectory points 552 and 554 may then be projected into the image based on the determined positions of corresponding trajectory points 522, 524 relative to ARTag 506 shown in FIG. 5A. In particular, trajectory point 522 with coordinates $(X_1, Y_1, Z_1)$ in a frame attached to ARTag 506 may be projected as virtual trajectory point 552 with coordinates $(U_1, V_1)$ in the image captured by the camera. Additionally, trajectory point 524 with coordinates $(X_2, Y_2, Z_2)$ in a frame attached to ARTag 506 may be projected as virtual trajectory point 554 with coordinates $(U_2, V_2)$ in the image. The virtual trajectory points 552 and 554 may then be graphically overlaid or otherwise displayed on the image of workcell 500 as part of an augmented reality presentation.

Figure 5C:
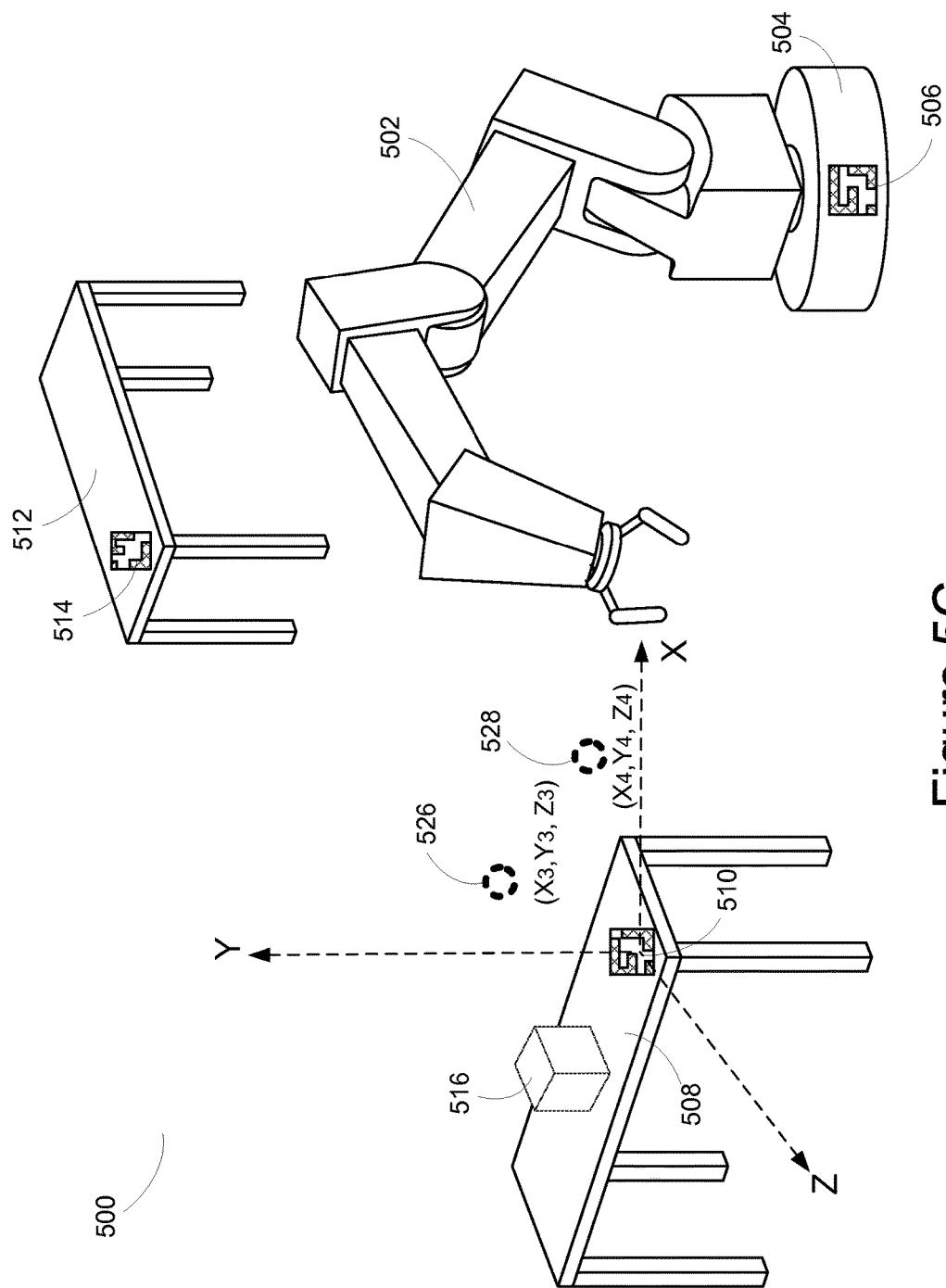

FIG. 5C illustrates trajectory points for a robot in an environment that includes ARTags on fixed objects, according to an example embodiment. More specifically, robot 502 is operating within workcell 500, which includes table 508, table 512, and box 516. Robot 502 has ARTag 506 positioned on the base 504 of the robot 502. Additionally, ARTag 510 is positioned at a chosen point on table 508 and ARTag 514 is positioned at a chosen point on table 512. Each of the ARTags 506, 510, 514 may have a separately identifiable pattern. By placing additional ARTags 510, 514 within the workcell 500, trajectory points may be projected into an image even when the image does not include the robot 502 or the ARTag 506 on the robot 502.

For example, trajectory points 526, 528 may be referenced with ARTag 510. The pose of ARTag 510 relative to robot 502 may first be determined. In particular, assuming the trajectory points 526, 528 are defined relative to base 506 of robot 504, a transformation (e.g., an amount of translation and rotation) between a first frame attached to ARTag 506 and a second frame attached to ARTag 510 may be determined. This transformation may used to determine the locations of trajectory points 526, 528 within the frame attached to ARTag 510. For example, trajectory point 526 may have coordinates ($X_3$, $Y_3$, $Z_3$) and trajectory point 528 may have coordinates ($X_4$, $Y_4$, $Z_4$) in the frame attached to ARtag 510.

ARTag 514 may similarly be referenced with ARTag 506 and/or ARTag 510 by determining the pose of ARTag 514 relative to ARTag 506 and/or ARTag 510. For instance, a transformation between a first frame attached to ARTag 506 and a second frame attached to ARTag 514 may also be determined. This transformation may be used to determine positions of trajectory points relative to the frame attached ARTag 514 as well. When multiple fiducial markers are captured within an image, there may also be redundancy benefits that enable more precise placement of virtual trajectory points within the image.

Figure 5D:
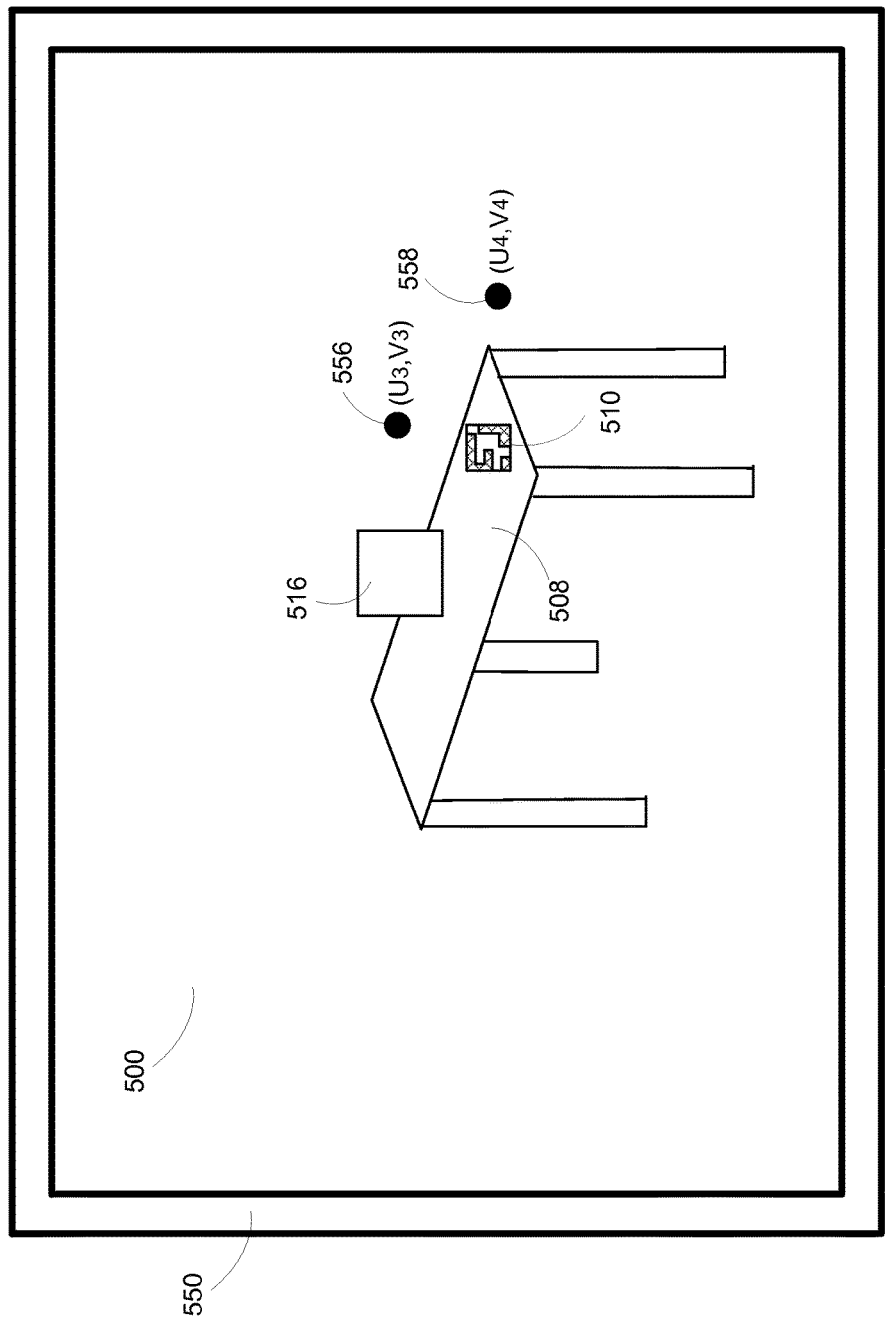

FIG. 5D illustrates an image of a portion of a workcell with overlaid virtual trajectory points, according to an example embodiment. More specifically, an image may be captured of a portion of a robot's workcell that does not include the robot. For instance, a user wearing an HMD may orient the camera of the HMD toward table 508 and box 516 within workcell 500 to see where certain trajectory points will cause the robot to move. Even though the robot 502 is not visible within the image, virtual trajectory points 556 and 558 may be projected into the image and displayed at positions that correspond to trajectory points 526 and 528 from FIG. 5C.

To determine where to position virtual trajectory points 556, 558 within the image, ARTag 510 may first be identified and located within the image. The size and shape of ARTag 510 within the image may be used to determine the pose of ARTag 510 relative to the camera. In particular, a transformation between a frame attached to ARTag 510 and a frame attached to the camera may be determined. Because the locations of trajectory points 526, 528 within the frame attached to ARTag 510 have been determined, the transformation can be used to determine where the trajectory points 526, 528 are located in a frame attached to the camera. The trajectory points 526 and 528 may then be projected into the image and represented graphically as virtual trajectory points 556 and 558 overlaid on the image. In particular, trajectory point 526 with coordinates ($X_3$, $Y_3$, $Z_3$) in a frame attached to ARTag 510 may be projected as virtual trajectory point 556 with coordinates ($U_3$, $V_3$) in the image captured by the camera. Additionally, trajectory point 528 with coordinates ($X_4$, $Y_4$, $Z_4$) in a frame attached to ARTag 510 may be projected as virtual trajectory point 558 with coordinates ($U_4$, $V_4$) in the image.

Within examples, an augmented reality presentation may include a virtually overlaid representation of trajectory points in a variety of different manners. FIGS. 6A, 6B, 6C, and 6D illustrate several possible types of presentations.

Figure 6A:
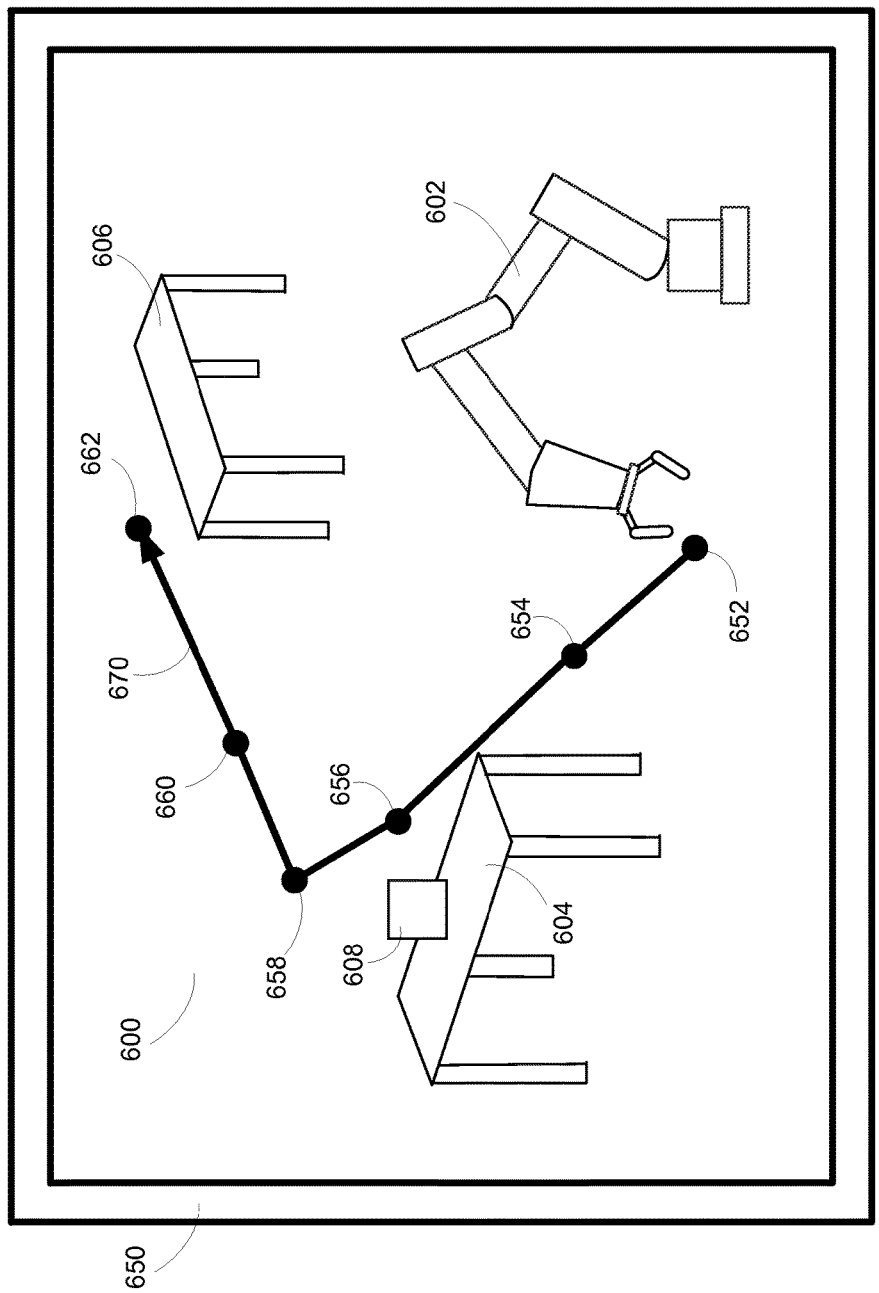
FIGS. 6A, 6B, 6C, and 6D illustrate additional example augmented reality presentations, according to example embodiments.

FIG. 6A illustrates an image of robot's environment with an overlaid virtual trajectory, according to an example embodiment. More specifically, a robot 602 may operate within a workcell 600 that includes table 604, table 606, and box 608. A display interface 650 may show an image of the workcell 600. Virtual trajectory points 652, 654, 656, 658, 660, and 662 may be overlaid on the image in accordance with the methods previously described. Additionally, virtual trajectory 670 connecting virtual trajectory points 652-662 may also be displayed on the image of workcell 600.

Within examples, a virtual trajectory may be a graphical representation of a sequence of connected trajectory points. The ordering of trajectory points within the trajectory may be determined based on prior information about an application program. For instance, the robot 602 may have previously been commanded to move through the trajectory points 652-662 in the order shown by virtual trajectory 670. In another example, only virtual trajectory 670 may be visually displayed on display interface 650 without specifically highlighting individual trajectory points.

In further examples, a user interface associated with display interface 650 may receive input data indicating one or more changes to a virtual trajectory for the robot. For instance, display interface 650 may include a touch-based interface aligned with the image. The user interface may allow a user to select different virtual trajectory points for virtual trajectory 670 and/or change the ordering of virtual trajectory points. In some examples, the robot 602 may also be commanded to move through a trajectory in workcell 600 that corresponds to virtual trajectory 670 and/or to individual trajectory points via the user interface as well.

In additional examples, individual trajectory points may also be modified via a user interface as well. For instance, a user may be able to select and drag a particular virtual trajectory point (e.g., virtual trajectory point 656) to change the position of the virtual trajectory point in the image. An output signal may then be provided to indicate a changed position of the corresponding trajectory point for the robot, where the change is determined by projecting the change in position of the virtual trajectory point back out into physical space. In this manner, pre-existing trajectory points may be adjusted by a user based on the current configuration of the workcell (e.g., to cause the robot to move around a new obstacle).

Figure 6B:
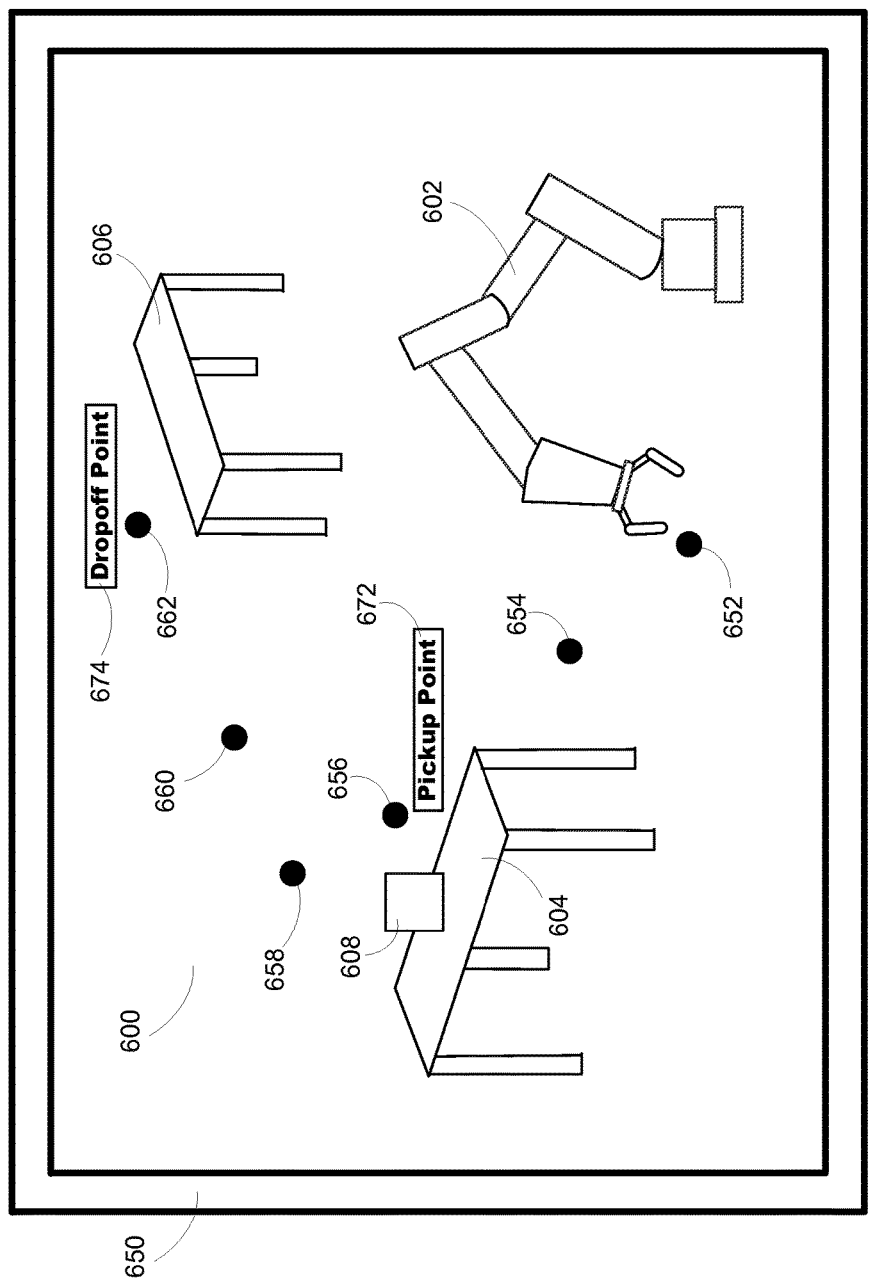

FIG. 6B illustrates an image of a robot's environment with overlaid semantic labels, according to an example embodiment. More specifically, trajectory points for a robot may be received from a list that includes certain semantic labels for corresponding points. For instance, the semantic labels may indicate operations performed by the robot at particular points in a trajectory. As illustrated in FIG. 6B, label 672 may indicate that virtual trajectory point 656 corresponds to a point where the robot 602 picks up an object such as box 608. Additionally, label 674 may indicate that virtual trajectory point 662 corresponds to a point where the robot 602 drops the object. The semantic labels may be overlaid on the image in addition to or instead of another representation of the virtual trajectory points. In some examples, the labels may help to remind a user why a robot has been commanded to move to a particular trajectory point in the past.

Figure 6C:
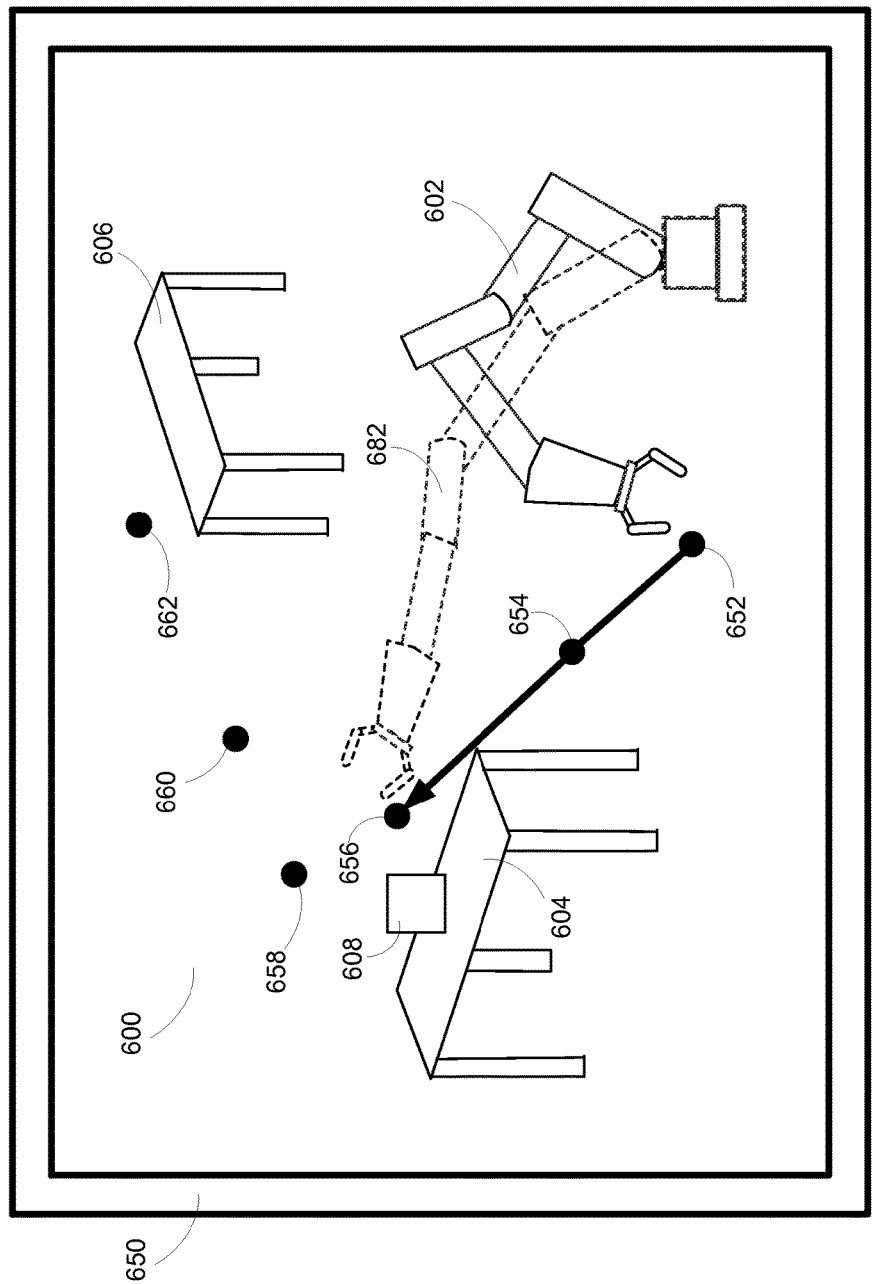

FIG. 6C illustrates an image of a robot's environment with an overlaid virtual simulation of robot movement, according to an example embodiment. More specifically, a sequence of robot movements may be illustrated graphically to show how the robot's motion through particular trajectory points will appear from the point of view of the camera. As illustrated in FIG. 6C, the robot 602 may be illustrated as virtual robot 682 showing the position of the robot 602 as it crosses virtual trajectory point 656. In a further example, a sequence of virtual robot positions may show the robot 602 moving through each of trajectory points 652-662. A virtual simulation may be helpful to provide a user with a more intuitive notion of how particular virtual trajectory points will cause a robot to move within its current environment.

Figure 6D:
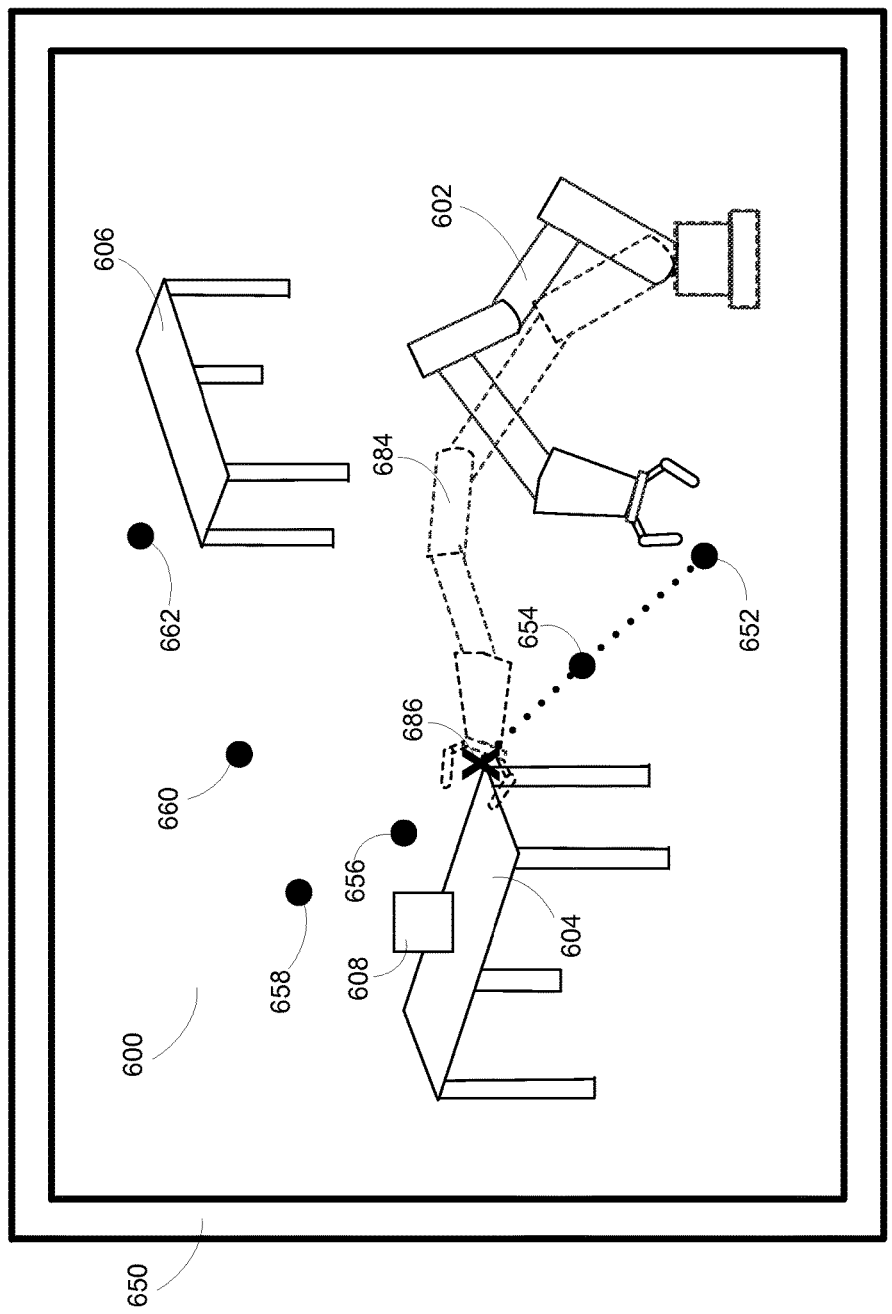

FIG. 6D illustrates an image of a robot's environment with an overlaid virtual collision point, according to an example embodiment. More specifically, the system may determine that a trajectory or sequence of trajectory points may cause a collision between the robot and one or more obstacles in the robot's environment. The potential collision point may be displayed within augmented reality to show a user where the potential collision may occur. For instance, as shown in FIG. 6D, a trajectory that causes robot 602 to move from a trajectory point that corresponds to virtual trajectory point 654 to a trajectory point that corresponds to virtual trajectory point 656 may cause the robot 602 to collide with table 604 at a collision point 686. Both a virtual annotation (e.g., an "X") showing collision point 686 as well as a projected position 684 of the robot 602 at the potential collision may be overlaid on the image to inform a user about the potential collision if the robot is commanded to move through the particular trajectory points.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

I claim:

1. A method, comprising:
   providing, within an environment, (i) a robotic device having a first fiducial marker on a base of the robotic device and (ii) a second fiducial marker on a fixed object disconnected from the base of the robotic device within the environment;
   referencing the second fiducial marker with the first fiducial marker to determine a pose of the second fiducial marker relative to the first fiducial marker;
   receiving, from a sensor, an image of the environment, wherein the image includes the second fiducial marker and excludes the robotic device and the first fiducial marker;
   determining, based on the image, a pose of the second fiducial marker relative to the sensor;
   determining a pose of the robotic device relative to the sensor based on the pose of the second fiducial marker relative to the first fiducial marker and based on the pose of the second fiducial marker relative to the sensor;
   determining, based on the pose of the robotic device relative to the sensor, respective positions of a plurality of trajectory points for the robotic device relative to the sensor; and
   providing for display of the image of the environment and an overlaid plurality of virtual trajectory points corresponding to the plurality of trajectory points, wherein the plurality of virtual trajectory points are positioned in the image based on the determined respective positions of the plurality of trajectory points for the robotic device relative to the sensor.

2. The method of claim 1, further comprising receiving a second image from the sensor, wherein the second image includes at least a portion of the robot device, the method further comprising determining an additional pose of the robotic device relative to the sensor based on the portion of the robotic device within the second image.

3. The method of claim 2, wherein determining the additional pose of the robotic device relative to the sensor further comprises:
   identifying the first fiducial marker on the base of the robotic device within the received second image;
   determining, based on the received second image, a pose of the first fiducial marker relative to the sensor; and
   determining the additional pose of the robotic device relative to the sensor based on the pose of the first fiducial marker relative to the sensor.

4. The method of claim 1, further comprising providing for display of an overlaid virtual representation of a trajectory for the robotic device, wherein the trajectory comprises a sequence of at least some of the plurality of trajectory points.

5. The method of claim 1, further comprising providing for display of a virtual simulation of the robotic device moving through the plurality of trajectory points.

6. The method of claim 1, further comprising providing for display of one or more virtual indications of one or more collision points between a trajectory that includes the plurality of trajectory points and one or more obstacles within the environment.

7. The method of claim 1, further comprising:
receiving the plurality of trajectory points from a trajectory point list, wherein the trajectory point list includes a plurality of semantic labels corresponding to the plurality of trajectory points; and
providing for display of the plurality of semantic labels at the determined respective positions of the plurality of corresponding trajectory points.

8. The method of claim 1, further comprising:
receiving, from an interface of a device that includes the sensor, input data indicating one or more adjustments to one or more positions of one or more of the plurality of virtual trajectory points in the image;
based on the received input data, determining one or more adjusted positions of one or more of the trajectory points that correspond to the one or more of the plurality of virtual trajectory points; and
providing an output signal indicating the one or more adjusted positions of the one or more of the trajectory points.

9. The method of claim 1, further comprising:
receiving, from an interface of a device that includes the sensor, input data indicating a selection of a particular one of the plurality of virtual trajectory points; and
providing instructions for the robotic device to move to one of the trajectory points that corresponds to the particular one of the plurality of virtual trajectory points.

10. The method of claim 1, wherein the fixed object containing the second fiducial marker comprises a supporting surface for one or more objects to be moved by the robotic device.

11. A system comprising:
a robotic device having a first fiducial marker on a base of the robotic device;
a second fiducial marker on a fixed object disconnected from the base of the robotic device;
a sensor; and
a computing system configured to:
receive, from the sensor, an image of an environment, wherein the image includes the second fiducial marker and excludes the robotic device and the first fiducial marker;
determine, based on the image, a pose of the second fiducial marker relative to the sensor;
determine a pose of the robotic device relative to the sensor based on the pose of the second fiducial marker relative to the first fiducial marker and based on the pose of the second fiducial marker relative to the sensor;
determine, based on the pose of the robotic device relative to the sensor, respective positions of a plurality of trajectory points for the robotic device relative to the sensor; and
provide for display of the image of the environment and an overlaid plurality of virtual trajectory points corresponding to the plurality of trajectory points, wherein the plurality of virtual trajectory points are positioned in the image based on the determined respective positions of the plurality of trajectory points for the robotic device relative to the sensor.

12. The system of claim 11, wherein the computing system is further configured to receive a second image from the sensor, wherein the second image includes at least a portion of the robot device, and wherein the computing system is further configured to determine an additional pose of the robotic device relative to the sensor based on the portion of the robotic device within the second image.

13. The system of claim 11, wherein the computing system is further configured to:
identify the first fiducial marker on the robotic device within a second received image;
determine, based on the second received image, a pose of the first fiducial marker relative to the sensor; and
determine an additional pose of the robotic device relative to the sensor based on the pose of the first fiducial marker relative to the sensor.

14. The system of claim 11, wherein the computing system is further configured to provide for display of one or more virtual indications of one or more collision points between a trajectory that includes the plurality of trajectory points and one or more obstacles within the environment.

15. The system of claim 11, wherein the fixed object containing the second fiducial marker comprises a supporting surface for one or more objects to be moved by the robotic device.

16. A non-transitory computer-readable medium having stored therein instructions, that when executed by a computing system, cause the computing system to perform functions comprising:
referencing a second fiducial marker with a first fiducial marker to determine a pose of the second fiducial marker relative to the first fiducial marker, wherein the first fiducial marker is provided on a base of a robotic device in an environment, and wherein the second fiducial marker is provided on on a fixed object disconnected from the base of the robotic device in the environment;
receiving, from a sensor, an image of the environment, wherein the image includes the second fiducial marker and excludes the robotic device and the first fiducial marker;
determining, based on the image, a pose of the second fiducial marker relative to the sensor;
determining a pose of the robotic device relative to the sensor based on the pose of the second fiducial marker relative to the first fiducial marker and based on the pose of the second fiducial marker relative to the sensor;
determining, based on the pose of the robotic device relative to the sensor, respective positions of a plurality of trajectory points for the robotic device relative to the sensor; and
providing for display of the image of the environment and an overlaid plurality of virtual trajectory points corresponding to the plurality of trajectory points, wherein the plurality of virtual trajectory points are positioned in the image based on the determined respective positions of the plurality of trajectory points for the robotic device relative to the sensor.

17. The non-transitory computer-readable medium of claim 16, wherein the functions further comprise receiving a second image from the sensor, wherein the second image includes at least a portion of the robot device, the functions further comprising determining an additional pose of the robotic device relative to the sensor based on the portion of the robotic device within the second image.

18. The non-transitory computer-readable medium of claim 16, wherein the functions further comprise:
identifying the first fiducial marker on the base of the robotic device within a second received image;
determining, based on the second received image, a pose of the first fiducial marker relative to the sensor; and
determining an additional pose of the robotic device relative to the sensor based on the pose of the first fiducial marker relative to the sensor.

19. The non-transitory computer-readable medium of claim 16, the functions further comprising:
receiving the plurality of trajectory points from a trajectory point list, wherein the trajectory point list includes a plurality of semantic labels corresponding to the plurality of trajectory points; and
providing for display of the plurality of semantic labels at the determined respective positions of the plurality of corresponding trajectory points.

20. The non-transitory computer-readable medium of claim 16, wherein the fixed object containing the second fiducial marker comprises a supporting surface for one or more objects to be moved by the robotic device.

\* \* \* \* \*